US009239039B2

(12) United States Patent
Herr et al.

(10) Patent No.: US 9,239,039 B2
(45) Date of Patent: Jan. 19, 2016

(54) ACTIVE CIRCULATION CONTROL OF AERODYNAMIC STRUCTURES

(75) Inventors: Stefan Herr, Greenville, SC (US); Anurag Gupta, Clifton Park, NY (US); Seyed Gholamali Saddoughi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 320 days.

(21) Appl. No.: 12/258,526

(22) Filed: Oct. 27, 2008

(65) Prior Publication Data
US 2010/0104436 A1 Apr. 29, 2010

(51) Int. Cl.
*F03D 11/00* (2006.01)
*F03D 1/06* (2006.01)
*F03D 7/02* (2006.01)

(52) U.S. Cl.
CPC *F03D 1/06* (2013.01); *F03D 7/022* (2013.01); *F03D 11/00* (2013.01); *F05B 2240/30* (2013.01); *F05B 2240/31* (2013.01); *F16C 2360/31* (2013.01); *Y02E 10/721* (2013.01); *Y02E 10/722* (2013.01); *Y02E 10/723* (2013.01)

(58) Field of Classification Search
CPC ..... F03D 7/022; F03D 11/00; F05B 2240/30; B64C 11/18; B64C 2027/7227; B64C 2027/725; B64C 2230/04; B64C 2230/18
USPC ..... 416/90 R, 91, 231 B, 97 R; 415/115, 914; 440/66, 67
See application file for complete search history.

(56) References Cited

U.S. PATENT DOCUMENTS

| 2,939,650 | A |   | 2/1968  | Coanda                    |
|-----------|---|---|---------|---------------------------|
| 3,830,450 | A |   | 8/1974  | Williams et al.           |
| 5,158,251 | A |   | 10/1992 | Taylor                    |
| 5,417,391 | A |   | 5/1995  | Savitsky et al.           |
| 5,447,283 | A |   | 9/1995  | Tindell                   |
| 5,464,321 | A | * | 11/1995 | Williams et al. ... 416/93 A |
| 5,727,381 | A | * | 3/1998  | Rogers ............. 60/231 |
| 5,791,601 | A | * | 8/1998  | Dancila et al. ...... 244/207 |
| 5,894,990 | A | * | 4/1999  | Glezer et al. ....... 239/423 |

(Continued)

FOREIGN PATENT DOCUMENTS

| GB | 2186033 A      | 8/1987 |
|----|----------------|--------|
| GB | 2452488 A      | 3/2009 |
| WO | 2009025548 A1  | 2/2009 |

OTHER PUBLICATIONS

N.J. Wood, "The Aerodynamics of Circulation Control Aerofoils", Joint Institute for Aeronautics and Acoustics, NASA-CR-168662, Stanford University, Dept. of Aeronautics and Astronautics, Stanford, California 94305, Jul. 1981.

(Continued)

*Primary Examiner* — Ninh H Nguyen
(74) *Attorney, Agent, or Firm* — Pabrita K. Chakrabarti (57) ABSTRACT

Active Circulation Control (ACC) of aerodynamic structures, such as a turbine blade, uses unsteady or oscillatory flow from either synthetic jets or pulsed jets to modify a velocity profile of the blade. The blade includes an opening disposed in a surface of the blade at a location proximate to a trailing edge, a leading edge, or both the trailing edge and the leading edge of the blade. An active flow control device in fluid communication with the opening produces a wall-jet of pulsed fluid that flows over the trailing edge, the leading edge, or both the trailing and leading edges of the blade and modify the velocity profile of the blade.

10 Claims, 6 Drawing Sheets

(56) References Cited

U.S. PATENT DOCUMENTS

| | | | |
|---|---|---|---|
| 6,109,566 A * | 8/2000 | Miller et al. ............... 244/207 |
| 6,543,719 B1 | 4/2003 | Hassan et al. | |
| 6,644,598 B2 | 11/2003 | Glezer et al. | |
| 6,722,581 B2 * | 4/2004 | Saddoughi ............... 239/102.2 |
| 6,940,185 B2 | 9/2005 | Andersen et al. | |
| 7,118,339 B2 * | 10/2006 | Moroz et al. ............... 416/1 |
| 7,128,082 B1 | 10/2006 | Cerretelli et al. | |
| 7,290,738 B1 | 11/2007 | Rogers et al. | |
| 7,354,247 B2 * | 4/2008 | Bonnet ............... 416/90 R |
| 7,387,491 B2 * | 6/2008 | Saddoughi et al. ............... 416/62 |
| 7,967,258 B2 * | 6/2011 | Smith et al. ............... 244/207 |
| 8,136,767 B2 * | 3/2012 | Cueman et al. ............... 244/208 |
| 2007/0231151 A1 | 10/2007 | Herr et al. | |
| 2008/0317598 A1 * | 12/2008 | Barbu et al. ............... 416/9 |
| 2010/0014970 A1 | 1/2010 | Bove et al. | |

OTHER PUBLICATIONS

Unofficial English translation of Office Action issued in connection with corresponding CN Application No. 200910209763.6 on Dec. 4, 2013.

* cited by examiner

ACTIVE CIRCULATION CONTROL OF AERODYNAMIC STRUCTURES

BACKGROUND

The invention relates to active circulation control of aerodynamic structures. More specifically, the invention relates to active circulation control for a aerodynamic structures, such as a wind turbine blade or a gas turbine blade, by using unsteady or oscillatory flow either via synthetic jets or pulsed jets to improve lift, flow-turning characteristics, or the handling of off-design conditions, as compared to the same blade without active circulation control.

Figure 13:
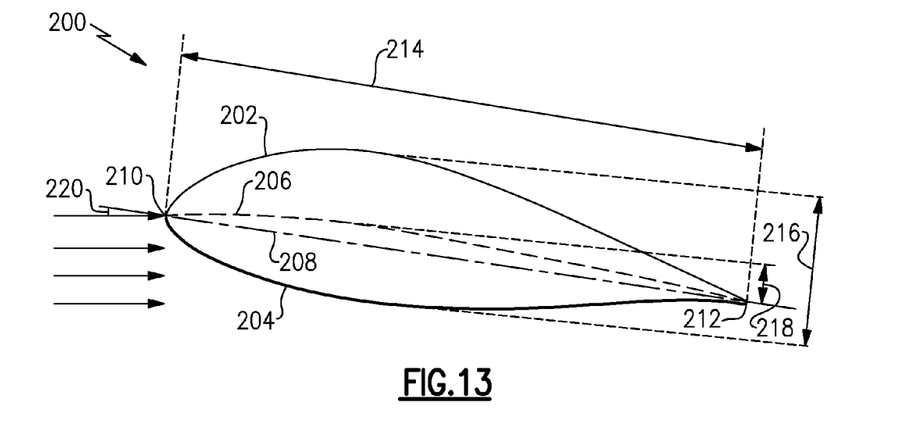
FIG. 13 is a description of various known physical parameters a conventional airfoil.

Referring now to FIG. 13, an airfoil or aerofoil 200 is the shape of a wing or blade (of a propeller, rotor or turbine) or sail as seen in cross-section. Some terminology associate with the airfoil 200 will be described. The mean camber line 206 of an airfoil 200 is a line drawn midway between the upper and lower surfaces 202, 204, respectively. The chord line 208 is a straight line connecting the leading and trailing edges 210, 212 of the airfoil 200, at the ends of the mean camber line 206. The chord length 214 is the length of the chord line 208 and is the characteristic dimension of the airfoil section. The maximum thickness 216 and the location of maximum thickness are usually expressed as a percentage of the chord length 214. Similarly, the maximum camber 218 and the location of maximum camber are usually expressed as a percentage of the chord length 214. For symmetrical airfoils, both mean camber line 206 and chord line 208 pass from center of gravity of the airfoil 200 and touch at the leading and trailing edges 210, 212 of the airfoil 200. The aerodynamic center is the chord wise length about which the pitching moment is independent of the lift coefficient and the angle of attack 220, which is the angle between the chord line 208 and the vector representing the relative motion between the airfoil 200 and the air (indicated by the arrows). The center of pressure is the chord wise location about which the pitching moment is zero.

An airfoil-shaped body moved through a fluid produces a force perpendicular to the motion called lift. Subsonic flight airfoils have a characteristic shape with a rounded leading edge, followed by a sharp trailing edge, often with asymmetric camber. Airfoils designed with water as the working fluid are also called hydrofoils.

A fixed-wing aircraft's wings, horizontal, and vertical stabilizers are built with airfoil-shaped cross sections, as are helicopter rotor blades. Airfoils are also found in propellers, fans, compressors and turbines. Sails are also airfoils, and the underwater surfaces of sailboats, such as the centerboard and keel, are similar in cross-section and operate on the same principles as airfoils. Swimming and flying creatures and even many plants and sessile organisms employ airfoils; common examples being bird wings, the bodies of fishes, and the shape of sand dollars. An airfoil-shaped wing can create downforce on an automobile or other motor vehicle, improving traction.

The effect by which a fluid jet attaches itself to an adjacent surface and remains attached was initially observed by Henri Marie Coandă, after whom the effect was named. "Coandă effect" is capable not only of attaching a free jet to a surface, but can also enable a tangential jet to negotiate and remain attached to a highly curved wall. The effect produces very strong entrainment of the surrounding fluid, independently of whether the external fluid is moving or stationary, and significantly reduces the surface static pressure under the jet. The point at which the flow separates from a curved surface in a two dimensional case can be controlled by the jet blowing momentum. The detailed physics of the effect are still not wholly understood.

The Coandă effect has important applications in various high-lift devices on aircraft, where air moving over the wing can be "bent down" towards the ground using flaps and a jet sheet blowing over the curved surface of the top of the wing. The bending of the flow results in its acceleration and as a result of Newton's Third Law pressure is decreased; aerodynamic lift is increased. The flow from a high speed jet engine mounted in a pod over the wing produces enhanced lift by dramatically increasing the velocity gradient in the shear flow in the boundary layer. In this velocity gradient, particles are blown away from the surface, thus lowering the pressure there.

The effect was first implemented in a practical sense during the U.S. Air Force's AMST project. Several aircraft, notably the Boeing YC-14 (the first modern type to exploit the effect), have been built to take advantage of this effect, by mounting turbofans on the top of wing to provide high-speed air even at low flying speeds, but to date only aircraft has gone into production using this system to a major degree, the Antonov An-72 "Coaler." The McDonnel Douglas YC-15 and its successor, the Boeing C-17 Globemaster III, also employ the effect, though to a less substantial degree. The NOTAR helicopter replaces the conventional propeller tail rotor with a Coandă effect tail.

An important practical use of the Coandă effect is for inclined hydropower screens, which separate debris, fish, etc., otherwise in the input flow to the turbines. Due to the slope, the debris falls from the screens without mechanical clearing, and due to the wires of the screen optimizing the Coandă effect, the water flows though the screen to the penstocks leading the water to the turbines. The Coandă effect is also used to make automotive windshield washers that function without moving parts and to create pneumatic logic circuits.

Figure 14:
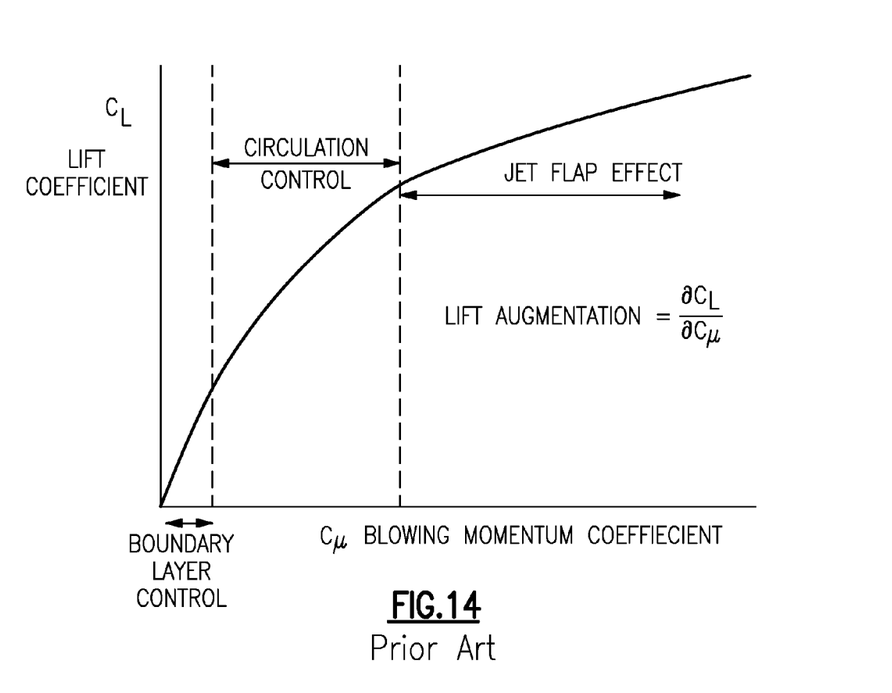
FIG. 14 is a graph of the performance trend of a conventional airfoil using circulation control with a steady wall-jet.

If airfoils are considered, then a conventional sharp trailing edges airfoil exhibits the well known "Kutta" condition, named for German mathematician and aerodynamicist Martin Wilhelm Kutta. The Kutta condition is a principle in steady flow fluid dynamics, especially aerodynamics, which is applicable to solid bodies which have sharp corners, such as the trailing edges of airfoils. The Kutta condition states that the rear stagnation streamline must emerge from the trialing edge in order to avoid discontinuities in velocity and pressure. Hence, the circulation around the airfoil is uniquely defined by the airfoil geometry, incidence and free stream velocity. If however, the trailing edge of the airfoil is rounded, then the rear stagnation point is free to move, depending upon the other parameters. If the airfoil is an ellipse aligned at zero incidence to the free stream direction, then the upper and lower surface separation points should be located at the same chordwise station and the net circulation will be zero. If now a jet of fluid is injected tangentially into the upper surface boundary layer, near the trailing edge, the Coandă effect will entrain the boundary layer and delay the separation of the upper surface flow. This causes a net increase in the circulation around the airfoil. The momentum of the blowing jet now controls the position of the rear stagnation point; the airfoil is subject to "Circulation Control" by blowing. If the blowing jet is strong enough to discharge excess momentum into the wake, then the airfoil performs in a similar manner to one fitted with a jet flap. The lift is no longer produced solely by delaying the upper surface separation, but has a jet reaction thrust component that reduces the net lift augmentations $\delta C_L/\delta C_\mu$, as shown in FIG. 14.

Figure 15A:
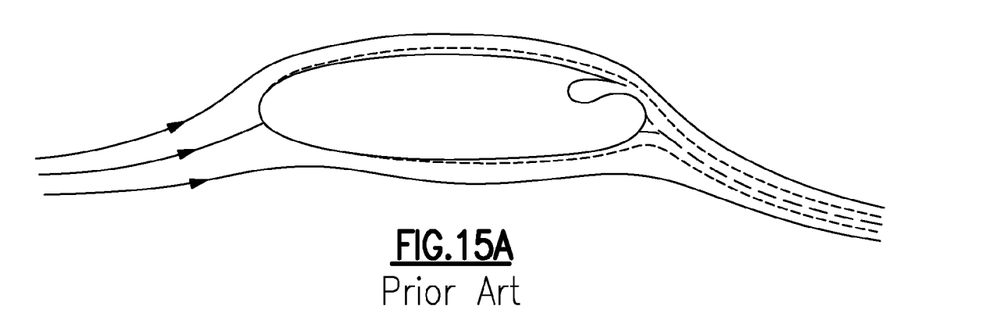
FIGS. 15A and 15B are pictorial representations of velocity profiles of a conventional airfoil using circulating control with a steady wall-jet in the trailing and leading edges, respectively.
Figure 15B:
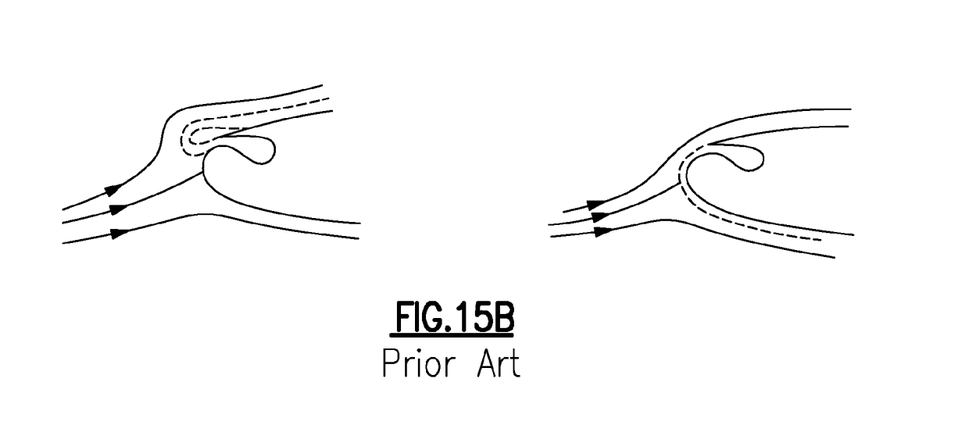

Circulation Control uses fluid injection to create a steady wall-jet at the proximity of a rounded surface in a blade to leverage the Coandă effect, as shown in FIGS. 15A and 15B. Circulation Control results in increased lift and systems using this principle have been conceptualized for a wide variety of applications—from aircraft wings to wind turbines. In aircraft wings applications, the Circulation Control works by increasing the velocity of the airflow over the leading edge and trailing edge of a specially designed aircraft wing using a series of blowing slots that eject high pressure jet air. The wing has a rounded trailing edge to tangentially eject the air through the Coandă effect, thus causing lift. The increase in velocity of the airflow over the wing also adds to the lift force through conventional airfoil lift production. In wind turbine applications, the Circulation Control works by increasing the flow rate by urging pressurized air into a duct and out a slot in the blade, thereby capturing the power from the wind flowing through a swept area of the wind turbine. Because conventional Circulation Control is generally accomplished by the steady injection of pressurized air, the need to provide large mass flow rates of such air has typically resulted in prohibitively large system costs.

It is therefore desirable to achieve Circulation Control around an aerodynamic structure, such as an airfoil, to minimize the loss of, or, alternatively increase lift producing capability, but to do so at a reduced system cost. This can be accomplished, for example, by reducing power requirements of a pressurized air source or removing the need for such a source altogether. More specifically, it is desirable to provide a blade, such as for using in wind turbines, turbomachinery, aerospace vehicles, and the like, that is optimized or designed to provide better load-bearing performance than other currently commercially available streamlined aerodynamic profiles.

SUMMARY

The inventors have recognized these and other problems associated with Circulation Control that uses pressurized fluid injection to create a steady wall-jet at the proximity of a rounded surface in a blade to leverage the Coandă effect. To solve these and other problems, the inventors have developed an Active Circulation Control (ACC) technique. In this technique, an unsteady pulsed jet of a chosen frequency and strength is blown over a convex/curved leading or trailing edge; the unsteady momentum addition (and consequent vorticity production) combines with the acceleration of the fluid around the designed curvature (similar to the Coandă effect with a steady jet) to provide an instantaneous lift increase while the frequency of actuation is chosen to be high enough to ensure that the time-averaged impact of the energizing jets is to provide an overall lift increase. As used herein, Active Circulation Control (ACC) is defined as control and modification of the aerodynamic behavior of the blade achieved by using unsteady wall-jets created either by zero-net mass flow active flow control actuators (like synthetic jets, plasma actuators etc) or using pulsed pressurized air.

In one aspect of the invention, an aerodynamic structure comprises an opening disposed in an outer surface proximate a trailing edge, a leading edge, or both the trailing edge and the leading edge of the aerodynamic structure; and an active flow control device disposed in the aerodynamic structure and in fluid communication with the opening; wherein the active flow control device produces an unsteady wall-jet of pulsed fluid that flows over the trailing edge, the leading edge, or both the trailing edge and the leading edge of the blade, thereby modifying a velocity profile of the aerodynamic structure.

In another aspect of the invention, a blade comprises an opening disposed in a surface of the blade at a location proximate to a trailing edge, a leading edge, or both the trailing edge and the leading edge of the blade; a centralized blowing source of pulsed fluid; and a duct in fluid communication with the opening and the centralized blowing source; wherein the centralized blowing source produces a wall-jet of pulsed fluid that flows over the trailing edge, the leading edge, or both the trailing edge and the leading edge of the blade, thereby modifying a velocity profile of the blade.

In yet another aspect of the invention, a method for Active Circulation Control (ACC) using an active flow control device disposed in an aerodynamic structure and in fluid communication with an opening, wherein the active flow control device produces an unsteady wall-jet of fluid that is released towards a curved surface of a trailing edge, a leading edge, or both a trailing edge and a leading edge of the aerodynamic structure, thereby modifying a velocity profile of the aerodynamic structure.

In still yet another aspect of the invention, a blade for a wind turbine, comprises an opening disposed in an outer surface of the blade proximate a trailing edge, a leading edge, or both the trailing edge and the leading edge of the blade; and an active flow control device disposed in the blade and in fluid communication with the opening; wherein the active flow control device produces an unsteady wall-jet of pulsed fluid that flows over the trailing edge, the leading edge, or both the trailing edge and the leading edge of the blade, thereby modifying a velocity profile of the blade.

BRIEF DESCRIPTION OF FIGURES

With reference now to the FIGS. wherein like elements are numbered alike.

DETAILED DESCRIPTION

In the following description, like reference characters designate like or corresponding parts throughout the several views shown in the figures. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity).

A "blade" as defined herein is a three-dimensional structure that lies in a fluid flow field and applies to a variety of devices, such as blades of wind turbines, gas turbines or aircraft engines, wings and pylons in aircraft, rotors of helicopters, and the like. Trailing edge "and/or" leading edge as defined herein implies the trailing edge, the leading edge, or both the trailing edge and the leading edge. In one embodiment, the trailing edge and the leading edge are rounded (i.e., with a finite radii of curvature). As used herein, "unsteady" is defined as a signal that varies with time the frequency and/or amplitude the actuator in the active flow control device.

Figures 1, 2:
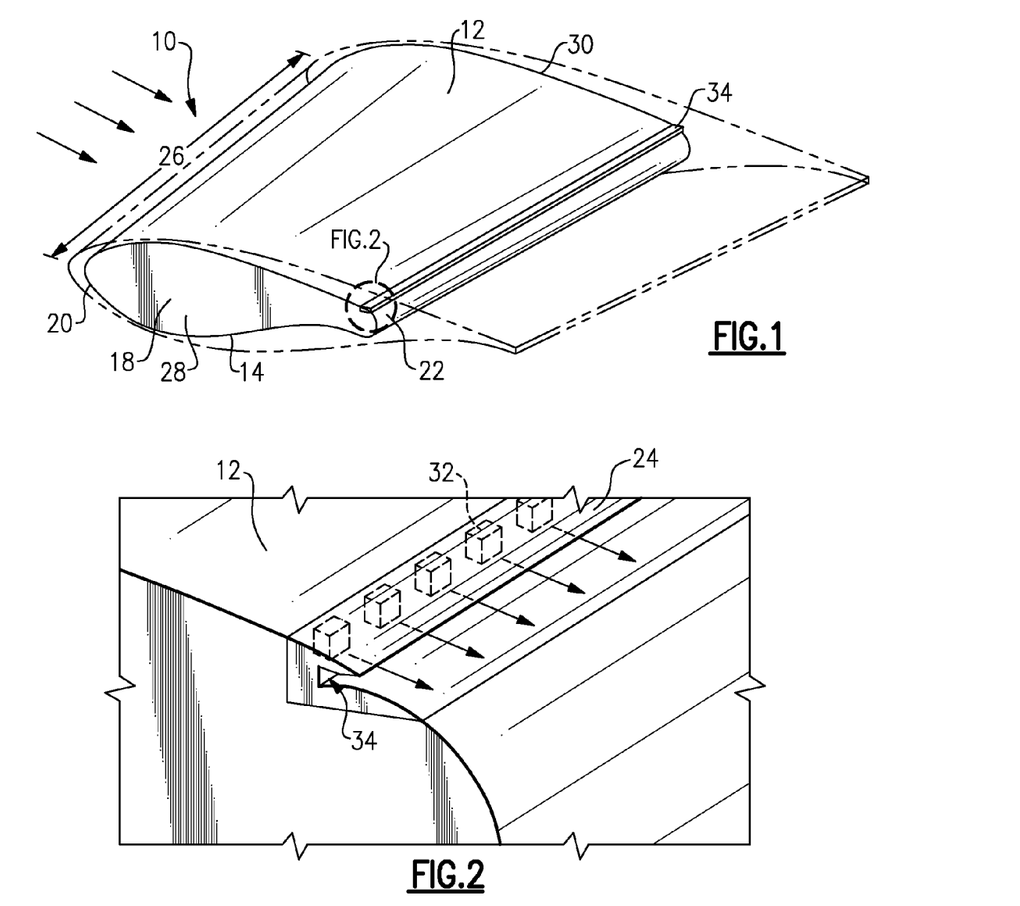
FIG. 1 is a perspective view of a portion of a blade that includes a plurality of active flow control devices according to an exemplary embodiment of the invention.
FIG. 2 is an enlarged view of the blade with the active flow control devices of FIG. 1.

Referring now to FIGS. 1 and 2, an aerodynamic structure 10, such as a blade, airfoil, and the like, with Active Circulation Control (ACC) is generally shown according to an embodiment of the invention. As used herein, Active Circulation Control is a technique in which an unsteady pulsed jet of a chosen frequency and strength is blown over a convex/curved leading or trailing edge; the unsteady momentum addition (and consequent vorticity production) combines with the acceleration of the fluid around the designed curvature (similar to the Coandă effect with a steady jet) to provide an instantaneous lift increase while the frequency of actuation is chosen to be high enough to ensure that the time-averaged impact of the energizing jets is to provide an overall lift increase. Active Circulation Control is defined as control and modification of the aerodynamic behavior of the blade achieved by using unsteady wall-jets created either by zero-net mass flow active flow control actuators (like synthetic jets, plasma actuators etc) or using pulsed pressurized air.

In general, the airfoil 10 includes an upper surface 12, a lower surface 14, and leading and trailing edges 20, 22. In an aspect of the invention, the upper surface 12 proximate the trailing edge 22 of the airfoil 10 includes a housing 24 that substantially extends the entire length 26 between a first end surface 28 and a second end surface 30 of the airfoil 10. Alternatively, the upper surface 12 may include a plurality of housings that each partially extend between the end surfaces 28, 30, instead of a single housing 24 that extends across the entire length 26 of the airfoil 10.

One or more active flow control devices 32 (shown in phantom in FIG. 2) are disposed within the housing 24. The active flow control devices 32 can be disposed along the entire length 26 of the blade 10, or alternatively along only a small section of the blade 10. In the illustrated embodiment, the active flow control devices 32 are disposed proximate to the trailing edge 22 of the blade 10 such that a pulsed jet of fluid emitted from the active flow control device 32 flows through an opening 34 in the housing 24 and over the curved surface (Coandă surface) of the trailing edge 22 of the blade 10 to produce Active Circulation Control. The opening 34 can have any desired length. For example, the opening 34 can have dimensions to accommodate only a single active flow control device 32, or can have a dimension that extends along the entire length of the housing 24 in which multiple active flow control devices 32 can be used to produce a series of pulsed wall-jets that are emitted through the opening 34. The multiple active flow control devices 32 can also be operated synchronously or non-synchronously with designed phase differences, if desired.

Examples of such active flow control devices 32 include zero-mass actuators like plasma actuators and piezoelectric synthetic jets; one specific example of the latter being dual bimorph synthetic jet (DBSJ) devices. DBSJ devices are desirable because such devices have low power consumption, low weight penalties, large control authority (jet strength), good frequency and amplitude range, compactness, and therefore permit ease of integration within the blade. In the case of DBSJ device, the injector attached to DBSJ should have converging nozzle shape to provide diffusion on the oscillatory back stroke of the DBSJ. The aforementioned characteristics are of particular use in blades used in wind turbines. In other embodiments, the active flow control device 32 system may be configured to modify the fluid flow using methods other than the synthetic jets. For example, plasma actuators could be used to achieve the same effect. In another embodiment, non-zero mass flow actuators that need a source of pressurized air or fluid, such as fluidic oscillators and flip-flop jets that provide pulsed velocity jets, can be used. When the active flow control device 32 is disposed in the housing 24 proximate to the trailing edge 22 and/or the leading edge 20, active circulation control is effected by virtue of a combination of the Coandă effect and unsteady momentum-addition induced lift as the pulsed jets of fluid travel over the curved surfaces (Coandă surfaces) proximate to the housing 24.

In an exemplary embodiment, the active flow control device 32 is a synthetic jet that provides unsteady wall-jets of pulsed fluid for the active circulation control of the blades 10 of a wind turbine 100. Synthetic jets generally comprise a flexible diaphragm incorporated into a synthetic jet housing. When the diaphragm vibrates, the internal volume of the synthetic jet housing changes, causing airflow into, within, and out of the synthetic jet housing. Changing the internal volume of the synthetic jet housing activates the wall-jet and provides a pulsed fluid flow through the opening 30. Various means can be used to activate the diaphragm of the synthetic jet. In one embodiment, a battery (not shown) can be used to activate the diaphragm. Other means of actuating the synthetic jet include a piezoelectric transducer, a waveform/sinusoidal drive transducer, a thermostatic actuator, a thermoelectrical actuator, a thermopneumatic actuator, a shape memory alloy, a magnetic method, or any other drive or actuator used in conjunction with a diaphragm piston, or any other movable structure that can be incorporated into the housing 24. Synthetic jets are disclosed in U.S. Pat. No. 6,722,581 and U.S. Patent Application 2003/0075615, both to Saddoughi, both of which are hereby incorporated by reference in their entirety.

In an alternate embodiment, a second housing (not shown) can also be located at the leading edge 20 of the blade 10. In this embodiment, the two housings can be located at different upper and lower surfaces 12, 14 of the blade 10. For example, the second housing proximate the leading edge 20 of the blade 10 can be located at the lower surface 14, while the housing 24 proximate the trailing edge 22 of the blade 10 can be located at the upper surface 12 of the blade. Each of these housings can contain an active flow control device 32 that are disposed proximate to either the trailing edge 22 and/or the leading edge 20 of the blade 10 such that a pulsed jet of fluid emitted from the active flow control device 32 flows over the curved surface (Coandă surface) of the blade 10 and produces Active Circulation Control. When active flow control devices 32 are used at both the leading edge 20 and the trailing edge 22, the active flow control device 32 proximate the trailing edge 22 can be used separate from and operate independently of the active flow control device 32 proximate the leading edge 20. Alternately, the active flow control device 32 proximate the trailing edge 22 can be used simultaneously with the active flow control device 32 proximate the leading edge 20.

The use of Active Circulation Control on the blade 10 can also be described in terms of at least two different classes of embodiments—one related to operational scenarios and the other to design scenarios. Focusing on the first class of embodiments, appropriate response strategies can be generated to various operating conditions. In these embodiments, active flow control instructions are provided in response to different operating conditions. Examples of such flow control instructions include modifying the velocity of the pulsed jets, modifying a frequency of introducing the pulsed jets, selectively activating available active circulation control devices on the blade surface, or the like, or combinations thereof.

The second class of embodiments covers "design" scenarios, which encompass modifications to the design characteristics of the active circulation control system. Examples of such changes in design characteristics include the location of the active circulation control device on the blade surface, the angle of the pulsed jets, (either the entire jet, the openings through which the pulsed fluid is injected, or combinations thereof), the size or shape of the pulsed jet exits (holes or openings), the change in shape of the blade cross-section to take advantage of the active circulation control device, or the like, or combinations thereof.

Figure 3:
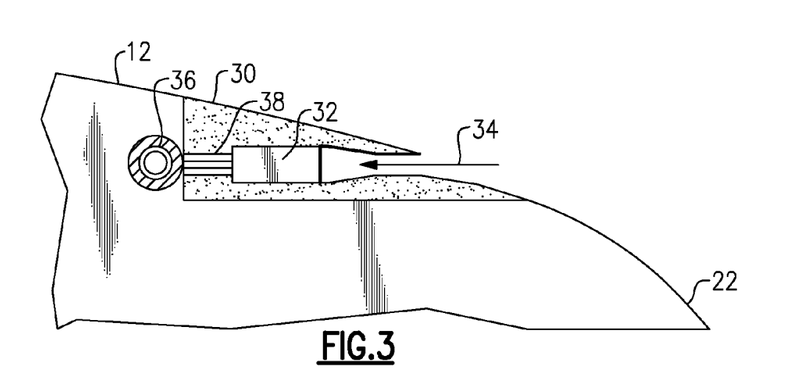
FIG. 3 is a cross-sectional view of a blade with a duct for providing a pressurized fluid to the active control devices according to an exemplary embodiment of the invention.

Active Circulation Control can also be achieved with other pressurized fluid sources (e.g., centralized pulsed blowing sources) that are not located in the blade, but are in fluid communication with openings located in the blade through ductwork. FIG. 3 illustrates an exemplary embodiment of a blade design that can be used to accommodate a centralized pulsed blowing source that can facilitate active circulation control. In this embodiment, the opening 34 of the blade 10 is in fluid communication with a duct 36 that is in fluid communication with the centralized pulsed blowing source (not shown). The opening 34 is generally in communication with the duct 36 along its entire length through a passage 38 such that fluid may flow within the duct 36 from the first end 28, toward the second end 30 and out of the entire length of the opening 34 adjacent the trailing edge 22 of the blade 10. The centralized pulsed blowing source may be used to generate unsteady wall-jets, and consequently, Active Circulation Control through the opening 34. The centralized blowing source can be located inside the blade or remotely with respect to the blade. The term "remotely" means that the centralized blowing source is located outside the blade and is not in physical contact with the blade. For example, in an airplane, the centralized blowing source can be located in the fuselage. Similarly, in a wind turbine, the centralized blowing source can be located on the support structure of the wind turbine.

In another exemplary embodiment, instead of a single opening 34 as shown in the FIG. 3, a plurality of openings 34 and ducts 36 may also be disposed proximate to the trailing edge 22 and/or the leading edge 20 to facilitate Active Circulation Control. The opening 34 can be located on the both the upper surface 12 and the lower surface 14 of the blade 10 proximate to the trailing edge 22 and/or the leading edge 20.

As noted above, the opening 34 may be disposed in the surface of the blade at locations proximate to the trailing edge, the leading edge, or both the trailing edge and the leading edge of the blade. In one embodiment, the opening 34 may be disposed at a distance of up to about 30% of the length of the chord 114 (at a given point on the blade), from the trailing edge and/or from the leading edge at that point on the blade.

Alternatively, the opening 34 may be blocked and fluid may be pumped into the duct 36 such that pressure is built up within the duct 36. The opening 34 may then be opened such that the airflows out of the opening 34. In one embodiment, the duct 36 is in fluid communication with a centralized blowing source that is located exterior (i.e., remote) to the blade 10. In another embodiment, if the blade is large enough (e.g., a large wind turbine blade), the centralized blowing source can be located in the blade.

In one embodiment, the centralized blowing source can generate the pulsed fluid by itself. In another embodiment, the centralized blowing source can generate a steady source of pressurized fluid while the pulsing of the fluid is generated by an auxiliary device such as a valve or a passive injector that is disposed in the ductwork between the centralized blowing source and the opening 34.

Examples of centralized blowing sources that generate pulsed fluids are a heat driven pulsed pump, a bellows metering pump, an oscillating pump, a peristaltic pump, or the like, or a combination comprising at least one of the foregoing sources. Examples of valves that can be used to convert a steady supply of pressurized fluid to an unsteady supply of pressurized fluid are flap valves, ball valves, fluidic gate valves, butterfly valves, or the like. The valves are generally in electrical communication with a solenoid valve that facilitates the conversion of a steady supply to an unsteady supply of air.

As noted above, passive injectors can be used to provide an unsteady injection of pulsed fluid given a steady input of pressurized fluid with the intention of reducing the mass flow, power and systems cost impact of the active circulation control method. Examples of such passive injectors are passive oscillators described in U.S. Pat. No. 7,128,082.

The active flow control devices or other pressurized fluid sources can produce wall-jets of pulsed fluid across the blade at frequencies of between about 10 to about 100,000 hertz (Hz), and preferably between about 50 to about 5,000 hertz (Hz), and most preferably between about 100 to about 2,000 hertz (Hz). For example, the actuator in the active flow control device comprising a synthetic jet can pulse jets of fluid across the surface of the blade at a frequency of between about 50 to about 5,000 Hz.

As noted above, when Active Circulation Control is employed, the blade 10 may have a non-conventional shape.

In one embodiment, the airfoil 10 may be substantially modified to be less streamlined, as compared to a commercially available airfoil (shown in phantom in FIG. 1). Specifically, the airfoil 10 of the invention has a significantly reduced chord while reducing the thickness only slightly leading to an increased "thickness/chord" ratio as reinforcement against variable and unpredictable loads. The less streamlined shape (i.e. its higher thickness to chord ratio) of airfoil 10 reduces the amount of lift that can be generated by the airfoil. However, the effect of Active Circulation Control from the unsteady fluid that is emitted from the opening 34 located proximate to the trailing edge and/or the leading edge can be used to compensate for this loss in lift.

A computer simulation was performed to demonstrate that the use of Active Circulation Control on a less streamlined aerodynamic structure, such as an airfoil, compensates for this loss in lift. In the simulation, the airfoil had a chord length of 1 meter with a maximum thickness of 30% of the chord length. To simulate an airfoil shape modification that would provide for greater structural strength and load-bearing capability, the thickness of the trailing edge was increased to about 10% of the chord length. This shape modification is shown in FIG. 1 (more streamlined airfoil shown in phantom).

Figure 4:
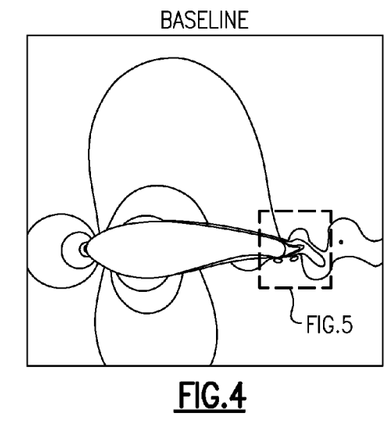
FIG. 4 shows a pictorial representation of a computer simulation of the velocity profile of an airfoil having a chord length of about 1 meter and a maximum thickness of about 30% of the chord length for an attack angle of about 0 degrees, but without the use of circulation control.
Figure 5:
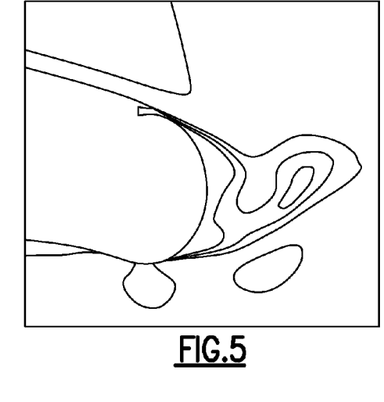
FIG. 5 is an enlarged view of the velocity profile around the trailing edge of the blade of FIG. 4.
Figure 6:
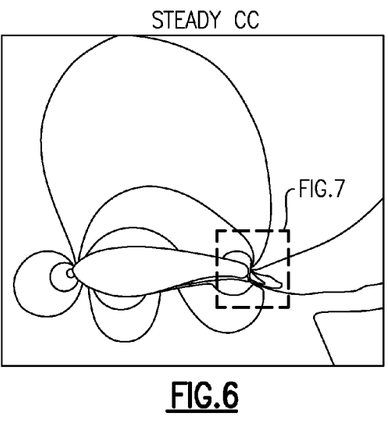
FIG. 6 shows a pictorial representation of a computer simulation of the velocity profile of the airfoil of FIG. 4, but with the use of circulation control comprising a steady wall-jet of air.
Figure 7:
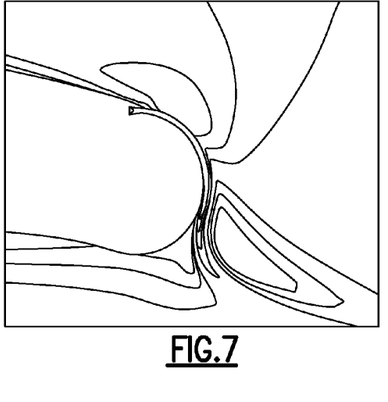
FIG. 7 is an enlarged view of the velocity profile around the trailing edge of the blade of FIG. 6.
Figure 8:
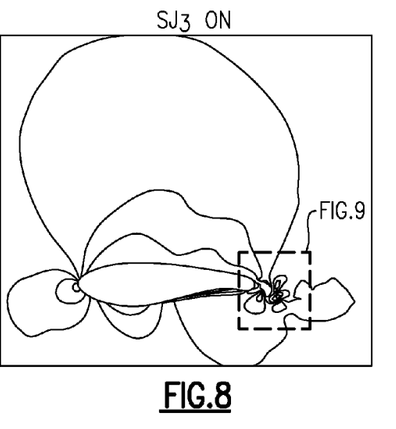
FIG. 8 shows a pictorial representation of a computer simulation of the velocity profile of the airfoil of FIG. 4, but with the use of the Active Circulation Control (ACC) of the invention.
Figure 9:
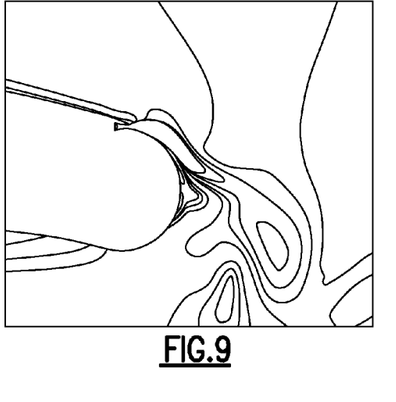
FIG. 9 is an enlarged view of the velocity profile around the trailing edge of the blade of FIG. 8.

FIGS. 4 and 5 illustrate the simulated velocity profile for the less streamlined aerodynamic structure (airfoil) without Active Circulation Control at an angle of attack of about 0 degrees. FIGS. 6 and 7 illustrate the simulated velocity profile for the less streamlined aerodynamic structure with Active Circulation Control, but with a steady jet of pressurized air emanating from the opening 34 with a $C_\mu$ of about 2.2% and a velocity of about 100 m/s. FIGS. 8 and 9 illustrate the simulated velocity profile for the less streamlined aerodynamic structure with Active Circulation Control, but with an unsteady, pulsed jet of pressurized air using a synthetic jet, such as a dual bimorph synthetic jet, with peak amplitude equal to about 2 times the free-stream velocity at a frequency of about 500 Hz.

Figure 10:
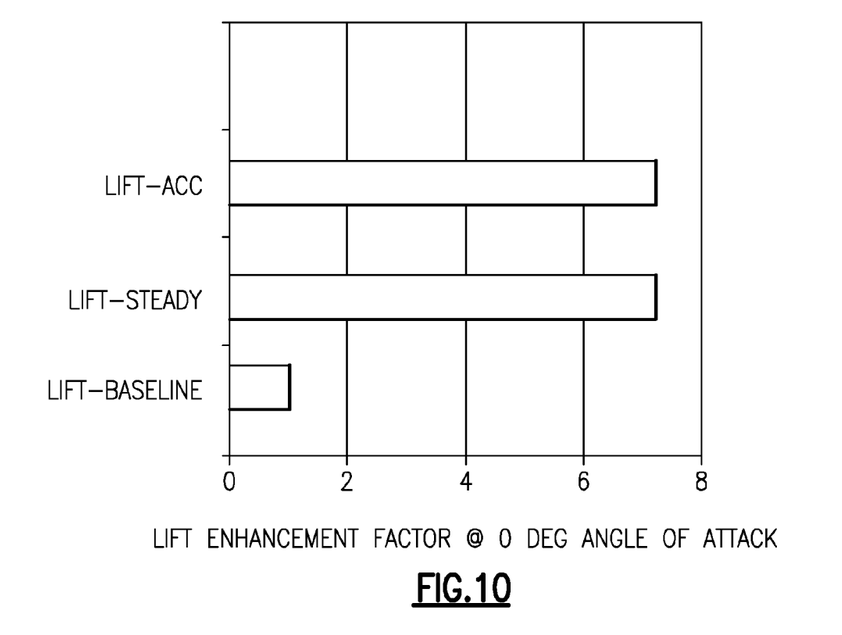
FIG. 10 is a plot illustrating the lift enhancement factor for the airfoils of FIGS. 4, 6 and 8.

The results of the simulations demonstrating the lift enhancement for the airfoil at an angle of attack of about 0 degrees are shown in the bar plot in FIG. 10. The results for simulation of conventional circulation control (steady injection, via pressurized air), and active circulation control (unsteady momentum addition/injection) both show about a 700% enhancement of lift demonstrating that both techniques provide similar performance enhancement. Note that the active circulation control results can be attained with smaller actuators that can be embedded in a small region and can be electrically powered—thus a supply of pressurized fluid in the internal structure of an airfoil/blade can be avoided if so desired; alternately, with the use of passive injectors to provide unsteady momentum addition, smaller mass flows of pressurized air and hence smaller power requirements than steady injection can be used. Hence the systems penalty of integrating a flow control system into say, a wind turbine or an aircraft can be reduced.

Thus from the above example, it may be seen that lift can be enhanced in amounts of about 10 to about 1,000%, specifically about 50 to about 800%, and more specifically about 100% to about 700%, over conventional blades that do not utilize unsteady momentum addition as described above.

The Active Circulation Control method and apparatus of the invention that provides increased lift in a less streamlined airfoil can be used in a variety of different aerodynamic structures. For example, one such structure is a blade of a wind turbine.

Figure 11:
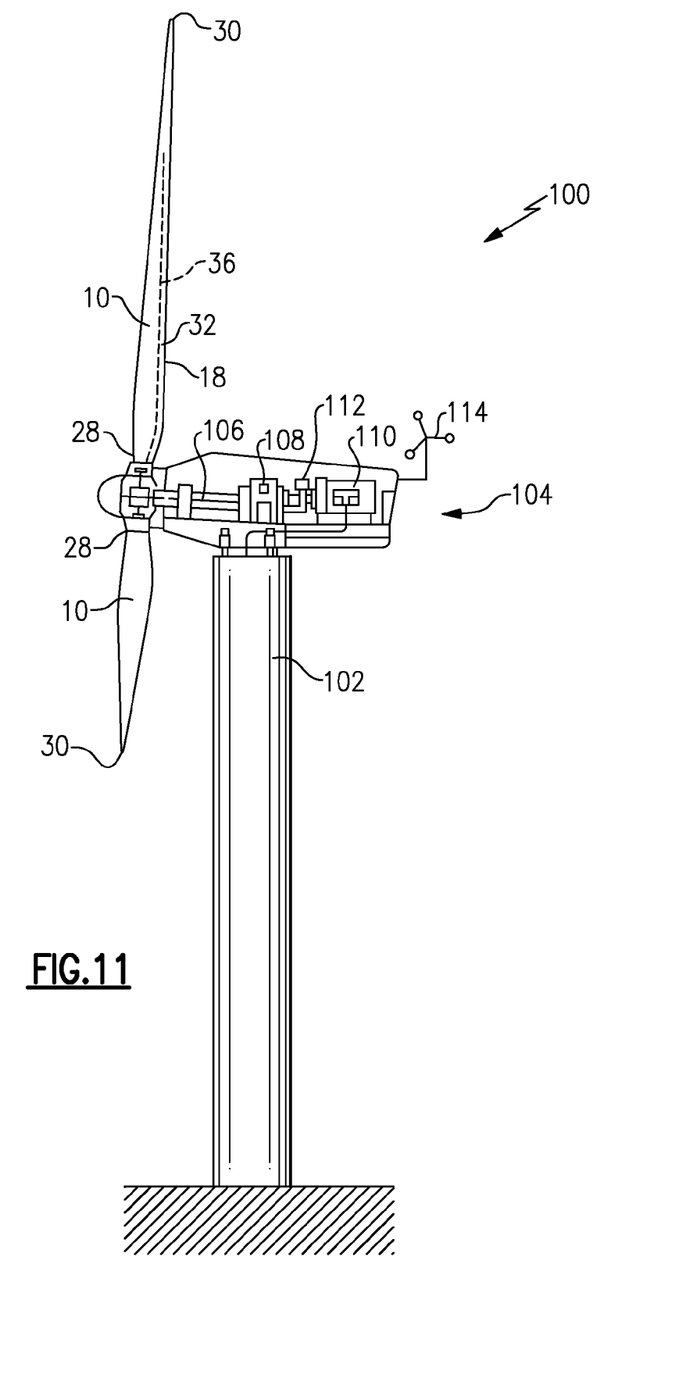
FIG. 11 is a side view of a wind turbine with a partial cross-section of the nacelle using the Active Circulation Control of the invention.

Wind turbines are typically categorized according to the vertical or horizontal axis about which the blades rotate. Referring now to FIG. 11, a horizontal-axis wind turbine is shown generally at 100. The wind turbine 100 includes a tower 102 supporting a nacelle 104 enclosing a drive train 106. The blades 10 are arranged on a hub to form a "rotor" at one end of the drive train 106 outside of the nacelle 104. The rotating blades 10 drive a gearbox 108 connected to an electrical generator 110 at the other end of the drive train 106 arranged inside the nacelle 104 along with a control system 112 that receives input from an anemometer 114.

The blades 10 generate lift and capture momentum from moving air that is them imparted to a rotor as the blades spin in the "rotor plane." Each blade is typically secured at its "root" end, and then "rotor radiuss" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord."

The outboard ends of the blades 10 are called "tips" and the distance from the tip to the root, at the opposite end of the blade, is called the "blade span." Because the root of the blade 10 is displaced from the blade's center of rotation when it is connected to the hub, the distance from the center of rotation of the blade 10 to tip is referred to as the "rotor radius" and designated here with the letter "R." Because many blades 10 change their chord over the span (and corresponding rotor radius), the chord length is referred to as the "root chord," near the root, and the "tip chord," near the tip of the blade. The resulting shape of the blade 10, when viewed perpendicular to the direction of flow, is called the "planform." The thickness of a blade 10 varies across the planform, and the term "thickness" is typically used to describe the maximum distance between the low pressure suction surface and the high pressure surface on the opposite side of the blade for any particular chord line.

The blade 10 generally includes an inboard region adjacent to the hub, an outboard region or middle region, and a tip region. The inboard region generally take up about the first half of the blade or so, the outboard region generally takes up about the next forty percent (40%) or so, and the tip region takes up about the final ten percent (10%) or so of the blade 10.

In the illustrated embodiment shown in FIG. 11, the duct 36 is comprised of a cavity located within the interior of the blade 10 that traverses a length 26 of the blade 10 from the first end 28 to the second end 30. In this embodiment, the first end 28 is a root end of the blade 10 and the second end 30 is a tip end of the blade 10. Preferably, the at least one opening 34 extends along the surface of the blade 10, generally parallel to a trailing edge 22 of the blade 10. The slot or opening 34 is generally in communication with the duct 36 along the length such that air may flow within the duct 36 from the first end 28, toward the second end 30 and out of the length of the opening 34 adjacent the trailing edge 22 of the blade 10.

In one embodiment, the opening 34 extends from the first end 28 (the root end) toward the second end 30 (the tip end) along the entire length of the blade 10 to the second end 30 (the tip end). In another embodiment, the opening 34 extends from the first end 28 (the root end) toward the second end 30 (the tip end) up to about 80% of the entire length of the blade 10. In yet another embodiment, the opening 34 extends from the first end 28 (the root end) toward the second end 30 (the tip end) up to about 60% of the entire length of the blade 10 toward the second end 30 (the tip end). It will be appreciated that the invention is not limited by the length that the opening 34 extends from the root end to the tip end of the blade, and that the invention can be practiced with any desired length, depending on design considerations.

The air flowing out of the opening 34 is preferably directed toward the trailing edge 22 of the blade 10 along the surface of the blade 10. However, the air flowing out of the opening 34 is not limited to being directed along the surface of the blade 10 toward the trailing edge 22 and may be directed out of the opening 34 in nearly any direction to impact the aerodynamic performance of the blade 10. The duct 36 and the opening 34 are designed such that the structural integrity of the blade 10 is not significantly affected by the inclusion of the duct 36 and the opening 34.

In one embodiment, the blade 10 is constructed of a carbon fiber composite material. Construction of the blade using the carbon fiber composite material permits the duct 36 and opening 34 to be integrally formed within the blade 10. In addition, the carbon fiber composite material has a relatively high strength to weight ratio permitting construction of a blade 10 having a relatively high strength and stiffness coupled with a relatively low weight. One having ordinary skill in the art will realize that these characteristics are particularly desirable for the wind turbine blade 10 of the invention. In addition, the carbon fiber composite material is highly resistant to corrosion from exposure to various weather conditions that the wind turbine 100 experiences during use. However, the blade 10 is not limited to carbon fiber constructions and may be constructed of nearly any material that is able to take on the shape/structure, withstand the structural loading and operate in the typical environment of the blade 10. For example, the blade 10 may be constructed of any number of polymeric materials including thermosets and/or thermoplastics, metal, wood, glass fiber or a combination of these materials.

The opening 34 is not limited to the above-discussed locations and configurations on the blade 10. For example, in an alternate embodiment, the at least one opening 34 may extend along the surface of the blade 10 on an inner seventy percent of the length 26, generally parallel to a leading edge 22 of the blade 10. Further, the opening 34 is also not limited to locations on either the leading or trailing edges 20, 22 and is not limited to a single opening 34 positioned along the surface 12 of the blade 10. For example, the opening 34 may be comprised of a plurality of shorter length openings (not shown) positioned at spaced locations nearly anywhere on the blade 10 from the first end 28 to the second end 30. The key being that the opening and/or multiple openings 34 communicate with the duct 36 such that air may flow through the duct 36 and out of the opening 34.

Figure 12:
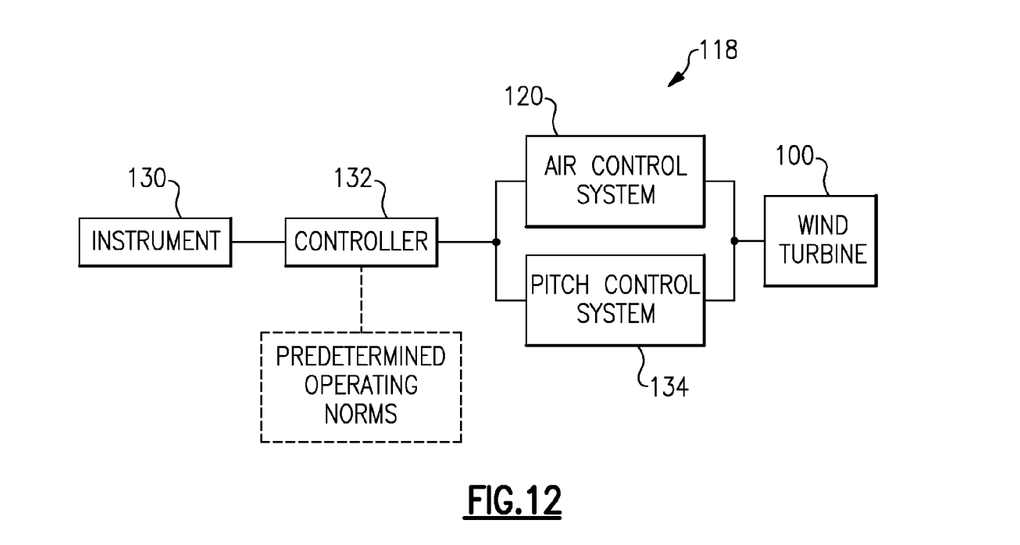
FIG. 12 is a schematic block diagram of a control system of the wind turbine shown in FIG. 11.

Referring to FIG. 12, the wind turbine 100 also includes at least one instrument 130 for measuring operating data of the wind turbine 100. In one embodiment, the at least one instrument 130 is selected from the group consisting of a strain sensor, a tachometer, a pressure sensor, an anemometer, a thermometer, a flow sensor, a position indicator, a barometer, a vibration gauge, a torque sensor, a power sensor and an accelerometer. The above-listed instruments measure various operating data of the wind turbine 100. The above list of instruments 130 is not meant to be all-inclusive and the wind turbine 100 may utilize nearly any instrument that is able to provide operating data regarding the wind turbine 100 and/or the environment that the wind turbine 100 is operating within. Preferably, multiple instruments 130 are utilized to measure operating data of the wind turbine 100 and the environmental conditions that the wind turbine 100 is operating within.

The control system 118 for the wind turbine 100 further includes a controller 132 that collects the operating data from the instruments and compares operating data to predetermined operating norms of the wind turbine 100. In one embodiment, the controller 132 activates the fluid control system 120 to trigger active flow control devices 32 that urge wall-jets of pulsed fluid from the opening 34. In another embodiment (not shown), the controller 132 actuates the fluid control system 120 to urge wall-jets of pulsed fluid from a centralized blowing source into the duct 36 and out of the opening 34. By urging wall-jets of pulsed fluid into the duct 36 and out of the opening 34, the controller 132 is able to control the extraction of energy from the wind flowing through a swept area A of the wind turbine 100 at specific wind speeds. The controller 132 may also regulate structural loads encountered by the wind turbine 10.

In one embodiment, the rate of momentum addition can be based upon the comparison between the operating data and the predetermined operating norms. By releasing pulsed jets of fluid into the duct 36 and out of the opening 34, or alternatively the opening 34, the controller 132 is able to control the extraction of energy from the fluid flowing through the wind turbine 100 at specific wind speeds. The controller 132 may also regulate structural loads encountered by the wind turbine 100.

The control system 118 for the wind turbine 100 further includes a pitch control system 134 that is coupled to the blade 10 and the controller 132. The pitch control system 134 alters the pitch of the blade 10 based upon signals from the controller 132.

As noted above, the use of Active Circulation Control of the invention is advantageous in that it permits control in variable and disruptive wind load environments. In another example, the controller maintains the active flow control devices in an activated state and turns them off upon detecting a change in incident wind velocity or direction that might increase system loads to undesirable levels.

The ability to mitigate system loads effectively by using active circulation control to provide reduced aerodynamic loading when needed permits use of large rotor diameters, while the ability to extract more power from blades additionally justifies use of such large rotor diameters. These techniques increase the available blade size and the power that can be extracted, thereby resulting in an improved rotor blade.

In one embodiment, existing blades can be removed from a turbine and replaced with blades that permit active circulation control. In such an event, the replacement blade may have a length "l" that increased by up to about 10%, specifically up to about 30% over the length of the blade that is being replaced. In one embodiment, the replacement blade may also have a thickness "t" that is increased by up to about 7.5%, specifically by up to about 20% over the thickness of the blade (a comparative blade) that is being replaced.

As disclosed herein, a method of achieving "Active Circulation Control" (ACC) in an aerodynamic structure, such as a blade, by the addition of momentum at a position that is proximate to the trailing edge and/or the leading edge of the blade has been described. Active Circulation Control is defined as control and modification of the aerodynamic behavior of the blade achieved by using lift enhancement created by a combination of unsteady momentum addition (and consequent vorticity production) and the Coandă effect as the fluid flow, energized by the added momentum, passes over the curved convex blade surface. The blades can be used in power generation and propulsion systems as well as aerospace vehicles. An exemplary application is the use of Active Circulation Control in wind turbine blades.

The unsteady momentum addition is created by the unsteady injection of fluid either from active flow control devices or from pressurized fluid sources that provide pulsed or intermittent injection. These active flow control devices and other sources of pulsed fluid are also termed unsteady sources because the fluid is transmitted over a curved surface of the blade in a time-varying fashion at a selected frequency.

The method disclosed herein can be advantageously used to enhance the aerodynamic performance of an aerodynamic structure, such as a blade. It can also be used to improve the aerodynamic performance of blades whose shapes have been tailored or optimized to achieve improved structural and/or load-bearing performance. It can also be advantageously used to degrade the aerodynamic loading and lifting performance of the blade in order to preserve the structural integrity of the blade if so desired.

The method can also be used for improving the aerodynamic performance of non-conventional blades that have larger cross-sectional areas (than comparative conventional blades) and that are generally inefficient at generating lift by themselves. Alternatively, the method can be used to control the aerodynamic performance of the blade in accordance with the demands of the system. In one embodiment, the active flow control devices or other pressurized fluid sources can be turned off to reduce lift on wind turbine blades and hence reduce loads on the blade during a storm. In another embodiment, the active flow control devices or other pressurized fluid sources can be activated in a manner so as to effectively reduce lift or flow turning during operations that are conducted under conditions that the blade has not been hitherto designed for.

The Coandă effect modifies the aerodynamic forces and moments when a wall-jet produced by the active flow control devices or other pressurized fluid sources is blown over a curved wall of the blade. The wall-jets are used to manipulate the location of the leading edge and/or trailing edge stagnation points, changing the bound circulation around the blade and hence controlling the lift and the flow-turning capability of the blade. In one embodiment, the unsteady wall-jets of fluid follow the entire curvature of the trailing edge and/or the leading edge to facilitate Active Circulation Control. In another embodiment, the unsteady wall-jets of fluid follow over only a portion of the curvature of the trailing edge and/or the leading edge to facilitate Active Circulation Control.

As described above, in one exemplary embodiment, the sources of the added momentum or pulsed fluid are localized zero mass flow actuators (e.g., synthetic jets) or other active flow control actuators that do not require piping, ductwork and sources of pressurized fluid such as pumps, or the like. These active flow control devices are light-weight, are generally located in the blade, and are integrated into the blade structure. They are designed to add momentum and emit a pulsed fluid at a controlled velocity (or momentum) and frequencies to add unsteady lift and produce the aforementioned wall-jets. Examples of such devices include piezoelectric synthetic jets (such as dual bimorph synthetic jet (DBSJ) devices), plasma-driven actuators, electromechanically driven actuators, or the like.

In another exemplary embodiment, the sources of the pulsed fluid can be centralized pulsed blowing sources that are not located in the blade, but instead are in fluid communication with openings located in the blade through ductwork. The unsteadiness in the fluid can be created and controlled at the source (e.g., by using an oscillating pump) or can be introduced in the ductwork or piping (e.g., by the use of valves, and the like) or can be introduced via injector design.

The pulsed fluid of a selected strength is ejected over the curved surface of the trailing edge and/or the leading edge at a selected frequency to produce active circulation control. In one advantageous embodiment, the combination of the Coandă effect with the unsteady momentum addition-induced lift derived from the pulsed fluid produces a performance similar to the performance produced by a steady blowing-driven circulation control system albeit at a lower system cost.

In yet another exemplary embodiment, the use of active circulation control permits controlling the amount of lift generated by the blade. When the blade is subjected to operating conditions for it was not hitherto designed and generates higher than expected loads, the generated lift can be varied by activating the active flow control devices or other pressurized fluid sources and by varying the intensity of the pulsed fluid from these sources. For example, blades used in wind turbines can often be subjected to varying and unpredictable loads. The source of pulsed fluid can be activated to different levels thereby producing pulsed fluids of varying intensity (depending upon the level of actuation) to compensate for the unpredictability in load levels thereby providing for a smooth output from the wind turbine despite variations in prevailing wind conditions.

In yet another exemplary embodiment, the method of active circulation control can be used to generate new blade designs where the blade is strengthened against such unpredictable loads by increasing the cross-sectional thickness of the blade or by changing the shape of the blade to a less aerodynamically optimized shape (e.g., an ellipse) but to one that's better suited for handling the aforementioned loads. Here, the active circulation control method is used to generate the desired aerodynamic performance and is shut off when such aerodynamic performance is not desired.

In yet another exemplary embodiment, active circulation control derivatives of existing conventional or commercially available airfoils can be created by modifying the trailing edge region of the existing airfoil, increasing the thickness and radius of curvature of the trailing edge region to a level that allows for the Coandă effect to form and integrating active circulation control devices in its proximity.

It is to be noted that the fluid used to obtain active circulation control can be air, water, steam, or any other fluid that can be used for providing blades with lift, depending on the fluid medium in which the blade operates.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A wind turbine comprising:
   a wind turbine blade comprising
      an opening disposed in an outer surface of the wind turbine blade proximate a curved trailing edge of the wind turbine blade, and
      active flow control devices disposed in the wind turbine blade and in fluid communication with the opening and configured for producing unsteady wall-jets of pulsed fluid that flows over the curved trailing edge, wherein the unsteady wall-jets of pulsed fluid comprise velocities and frequencies sufficient to adjust the overall lift of the wind turbine blade; and a control system for providing active flow control instructions to the active flow control devices that vary with respect to changing wind speeds, changing structural loads of the wind turbine, or combinations thereof, wherein the active flow control instructions comprise modifying the velocity of the pulsed jets and selectively activating available ones of the active flow control devices.

2. The wind turbine of claim 1, wherein the active flow control devices comprise localized zero mass flow actuators within at least one housing proximate the trailing edge.

3. The wind turbine of claim 2, wherein the localized zero mass flow actuators comprise synthetic jets, each comprising a synthetic jet housing, a flexible diaphragm situated within the synthetic jet housing, and a synthetic jet actuator for activating the diaphragm.

4. The wind turbine of claim 3, wherein the synthetic jets comprise dual bimorph synthetic jets.

5. The wind turbine of claim 3, wherein the synthetic jet actuators are selected from the group consisting of a piezoelectric transducer, a waveform/sinusoidal drive transducer, a thermostatic actuator, a thermoelectrical actuator, a thermopneumatic actuator, a shape memory alloy, or a combination thereof.

6. The wind turbine of claim 1, wherein the opening extends up to about 80% of the length of the wind turbine blade.

7. The wind turbine of claim 1, wherein the opening is located at a distance of up to about 30% of a chord length from the trailing edge of the wind turbine blade.

8. The wind turbine of claim 1, wherein the overall lift increase comprises an instantaneous overall lift increase.

9. The wind turbine of claim 1, further comprising at least one instrument for measuring operating data of the wind turbine.

10. The wind turbine of claim 9, wherein the controller uses the operating data for generating the active flow control instructions that vary with respect to changing wind speeds.

* * * * *